July 9, 1935. J. P. BEM 2,007,558
FRUIT CORING MACHINE
Filed March 13, 1933
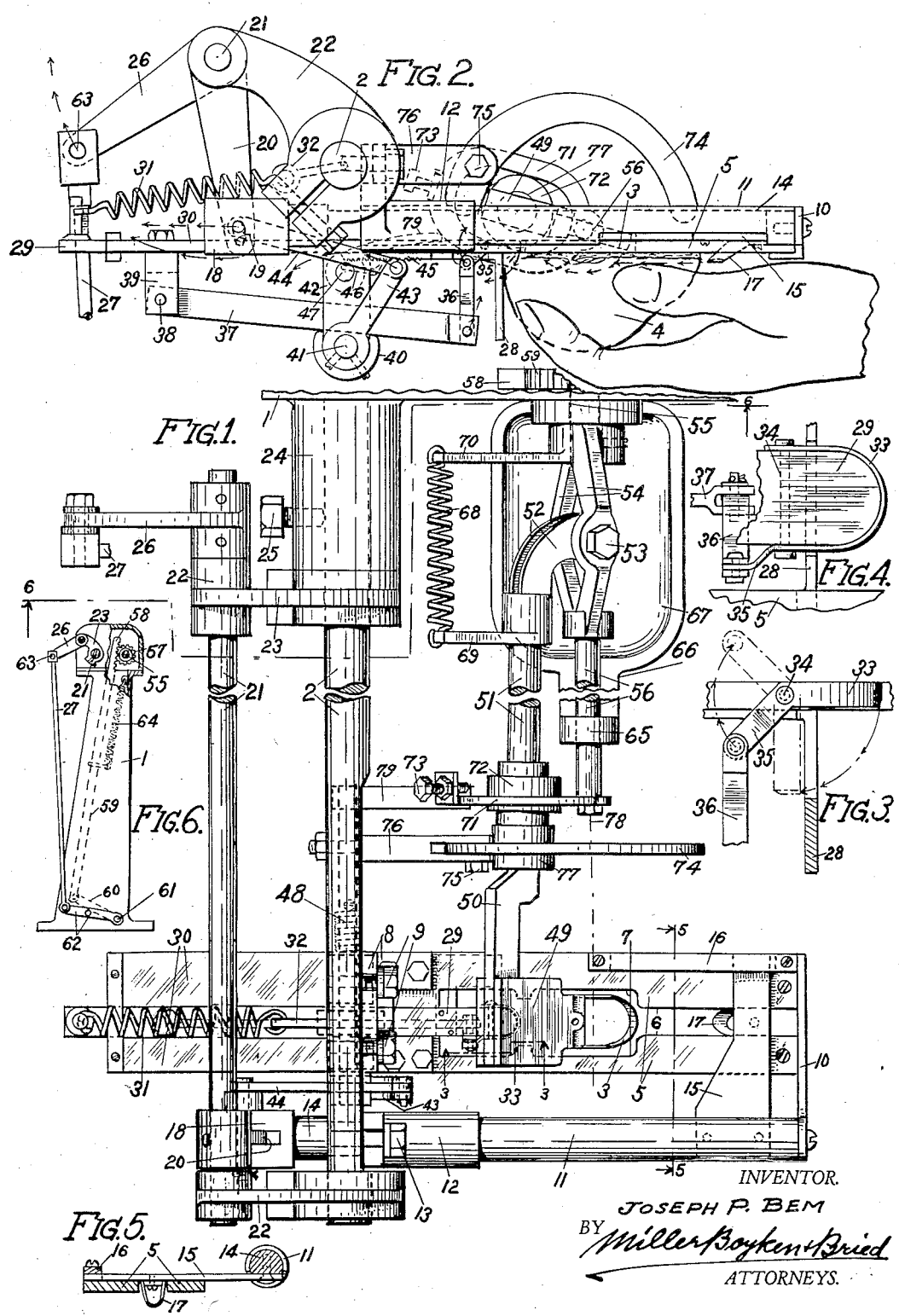
INVENTOR.
JOSEPH P. BEM
BY Miller Boyken & Bried
ATTORNEYS.

Patented July 9, 1935

2,007,558

UNITED STATES PATENT OFFICE 2,007,558

FRUIT CORING MACHINE

Joseph P. Bem, Oakland, Calif., assignor to Pacific Machinery Company, San Francisco, Calif., a corporation of California Application March 13, 1933, Serial No. 660,482

13 Claims. (Cl. 146—52)

This invention relates to fruit coring and pitting machines and has for its objects an improved machine for coring half pears while also removing the hard stem portion and the bloom residue at the base of the fruit. Other features and advantages of the invention will appear in the following specification and accompanying drawing.

In the drawing Fig. 1 is a plan view of the operative portions of my new machine projecting horizontally from a supporting pedestal, a portion only of the pedestal being shown.

Fig. 2 is an end elevation of Fig. 1 additionally showing the hand of an operative holding a half pear against the under side of the fruit support for coring.

Fig. 3 is an enlarged cross section of a portion of Fig. 1 as seen from the line 3—3 thereof showing the action of the bloom removing blade.

Fig. 4 is a plan view of Fig. 3.

Fig. 5 is a cross section of Fig. 1 taken along the line 5—5 thereof.

Fig. 6 is a greatly reduced end elevation of the pedestal with a portion shown in section substantially as along the line 6—6 of Fig. 1 to indicate the driving parts carried by the pedestal.

Before describing the drawing it may be stated that the invention comprises improvements on the type of machine shown in my copending patent applications filed under Serial Nos. 492,774, 614,426 and 625,724, the present improvements adapting the apparatus for simultaneous coring, stem grooving and bloom residue removal or tipping without manipulation of the half fruit by the operative other than simply placing it initially in position against the under side of the fruit positioning arms. As the present improvements relate only to the mounting arrangement and cooperation of the several cutting blades, the present drawing and description are drawn principally to show the operation of these parts.

In further detail the drawing shows the machine to consist of a pedestal 1 with a fixed supporting arm 2 projecting horizontally from one side of the pedestal at about table height so as to pass over the knees of a seated operative and support the arched coring blade 3 at a convenient height substantially above the lap of the seated operative to enable her to manually present a half pear 4 under it for coring, and with the fingers of the hand under the half pear as shown in Fig. 2 holding the fruit against the under surface of a pair of flat horizontally projecting arms 5 spaced apart to provide a slot 6 between them, and which slot is widened out somewhat at 7 for a distance through which the arched coring blade 3 swings in cutting out the core of the fruit. These arms are rigidly connected by a bracket 8 secured to the fixed supporting arm 2 as by bolts 9 and the forward ends of the arms 5 are connected by a bracket 10 which projects to one side of the arms and supports the outer end of a tubular cover 11 which lies alongside and slightly above the arms 5 and is provided at its inner end with a hub bracket 12 supported from the end of the fixed supporting arm 2 as by the bolt 13.

The lower side of the tubular cover 11 is open for a distance and slidably supported within it and passing through a bearing opening in member 12 is a rod 14 to the forward end of which is secured a flat arm 15 which lies upon the fruit positioning arms 5 and is slidably retained thereagainst by means of an overlying guide strip 16 secured along the outer edge of one of the arms 5, while secured to arm 15 and projecting downward into the slot 6 is a stem core grooving blade 17 formed like a small arch or loop and adapted when moved along the slot 6 to cut out a central groove along the pear to remove the stem core or hard continuation of the stem which extends into the fruit. To thus move the stem coring blade 17 the opposite or inner end of rod 14 is provided with a yoke or fork 18 pivoted in a short slot 19 to a rocker arm 20 extending downwardly from a rock shaft 21 which lies parallel but somewhat above the main supporting arm 2 and is rotatably supported at its outer end in a bearing bracket 22 rigidly clamped to the extreme outer end of supporting arm 2, and at its inner end by a similar bearing bracket 23. Main supporting arm 2 may be rigidly held in position in a boss 24 on pedestal 1 by means of a heavy set screw 25.

For the purpose of rocking shaft 21 to slide blade 17 back and forth, the inner end of shaft 21 is provided with a crank 26 to the outer end of which is connected a rod 27 operated from the foot treadle of the machine as will be later described.

When the half pear is positioned against the under sides of the arms 5 the base or bloom end of the fruit is abutted against a downwardly extending plate or stop 28 carried on the under side of forward end of a slide 29 which is guided between the rear portions 30 of arms 5, and resiliently urged forward by a spiral tension spring 31 anchored at its forward end to an eyelet 32 projecting from main supporting arm 2. The forward end of the slide is rounded (as shown in Fig. 4) and fitting around this rounded end is a small arched blade 33 with its cutting edge directed downwardly and its side runs pivoted through the slide at 34, (Figs. 2, 3 and 4) then, extending angularly as at 35 to form operating cranks for the blade which are pivoted at their ends to a link 36 which extends downwardly to a horizontally positioned lever 37 extending along under the slide and pivoted at 38 to a small bracket 39 secured to the under side of the slide, and which lever is heavy enough to fall of its own weight to pull the link 36 downward and raise the little arched blade 33 from the dotted position to the position shown in full lines in Fig. 3, but the lever is lifted positively to pull the blade downward to cut out the bloom residue every time the machine is operated. The means to accomplish this consists of a small cam 40 on a short shaft 41 rotatably supported in brackets 42 secured to and projecting downwardly from the fruit positioning arms, and to the end of which shaft 41 is secured a small crank 43 pivotally connected at its outer end with crank arm 20 by means of a link 44, all in a manner so that when crank arm 20 is oscillated by the rocking of rock shaft 21 the lever 37 will be raised at the same time the slide rod 14 is drawn back to thus pull the grooving blade 17 along the slot 6 and swing the bloom blade downward.

The stop plate 28 against which the base of the fruit is abutted, it should be noted, is set back a short distance from the forward curved end 29 of the slide so as to permit the curved end of the slide, and the little curved blade 33 surrounding it to overlap the half pear sufficiently for the blade in swinging downwardly to cut out the bloom residue of the fruit. Also to be observed is that this stop plate 28 is notched to just pass the curved blade to permit it to emerge from the fruit to the dotted position in Fig. 3, also that the plate is attached to the slide, and the blade 33 is also mounted on the slide so that both move back and forth with it when a fruit half is pushed against the stop plate with sufficient force to stretch spring 31. The slide carries at its under side a small rack 45 which is automatically engaged by a pawl 46 projecting from a shaft 47 mounted in brackets 42 and which shaft is urged by a spiral spring 48 to turn in a direction to throw the pawl into engagement with the rack to instantly lock the slide after the fruit has been pushed against the stop plate 28 to desired position of adjustment upon starting movement of the main coring blade as will be later further explained, though the rack and pawl lock itself forms no separate part of the present invention, as it is fully shown in my copending case Serial No. 492,774, now issued as Patent No. 1,926,965 of Sept. 12, 1933.

The main coring blade 3 is a thin arched steel band sharpened along its edge and secured at its ends to a block or housing 49 in turn secured to the offset end 50 of a carrier arm 51 which extends in a substantially horizontal direction toward the pedestal 1 and is provided at its other end with a fork 52 pivoted transversely at 53 to opposite sides of a yoke 54 which rigidly connects two aligned sections 55 and 56 of a rotatable shaft. Section 55 of the shaft is rotatably supported by the pedestal and is rocked by means of a gear 57 secured to it and engaged by a rack rod 58 carried on the upper end of a rod 59 extending down within the pedestal to a lever 60 secured at one end to a short treadle shaft 61 to which is also secured the foot treadle 62, and from the outer end of which foot treadle a rod 27 extends upwardly to connect at 63 with crank 26 of rock shaft 21 to operate the bloom removing blade 33 and stem grooving blade 17 as previously described. The treadle and rods 59 and 27 are always resiliently urged upwardly by a heavy tension spring 64 so as to throw all three blades to the opposite ends of their strokes from those indicated in the drawing, so that upon depressing the treadle the blades will all be thrown back to starting position as shown in the drawing figures and upon releasing the treadle the blades will all be resiliently drawn through the fruit by the force of spring 64.

Shaft section 56 is revolvably supported in an outboard bearing 65 carried on a fixed bracket 66 which is formed into a drip pan 67 under the shaft yoke and is really the coring blade shaft which is revolved about a half turn by the rack and gear within the pedestal and when it revolves it turns the blade-carrying arm 51 which is pivoted to it at 53 while at the same time permitting the arm 51 and main coring blade 3 to swing on pivot 53 so that the blade may rise and fall in the plane of the arch and a tension spring 68 is therefore provided to normally tend to lift the blade upward away from the fruit. This spring 68 is connected at opposite ends to arms 69 and 70 projecting at right angles from fork 52 and yoke 54 and the total movement of the arm 51 in either direction is limited by a yoke 71 carried by the end of shaft 56 which embraces a roller 72 on arm 51 and is further provided with a set screw 73 for adjusting the outward movement of the roller in the yoke. It will be seen that with the parts thus far described, by turning shaft 55 arm 51 would turn and as the roller 72 would at all times bear against the end of the yoke slot through the effect of spring 68 the blade 3 would simply turn in a circle from the axis 78 of shaft 56 which passes through the plane of the blade. However, since it is required that the blade in coring the half pear should not travel in a circular path but should follow an elongated shallow path corresponding to the shape of the pear core, means is provided to adjust the path of travel to any shape, length, or depth of cut desired. This means comprises a cam or guide 74 which may be of any shape and which is also adjustably bolted at 75 to a bracket 76 extending from the main supporting arm 2, and which cam overlies a second roller 77 on arm 51 so that the shape and adjustment of the cam will determine the length, depth, and form of the coring cut of blade 3. The position of the blade at the start of the cut is shown in Figs. 1 and 2 and the small arrows in Fig. 2 denote generally the paths of travel of the three blades through the fruit. The main coring blade 3 makes about a half turn from the position shown, coming out of the fruit just sufficiently forward of the curved end of slide 29 and therefore the cut made by blade 33, to form a bridge across the fruit half between the two cuts to hold it in natural shape. Blade 33 swings downward at an angle so as to cut a curved notch out of the edge of the bloom end of the pear to carve out the hard remainder of the bloom or bloom core of the fruit.

From a consideration of Fig. 1 it will be evident that the core of a half pear may readily be seen through the arched blade 3 so that in positioning it manually the operative may slide it until she sees that the blade 3 will upon descent properly cut out the core, and the slot 6 permits visual aligning of the fruit so that grooving blade 17 will do its work properly, while the abutting of the base of the fruit against the stop plate 28 carried by the slide 29 insures the proper relation of the bloom removing blade 33 to the fruit.

The slide 29 moves back freely when the fruit is pushed against the stop plate 28 but the moment the foot of the operative is released from the treadle the main actuating spring 64 raises the treadle and connected mechanism to swing the blades as stated, and yoke 71 in swinging about center 78 lifts from in contact with the end of a small lever 79 projecting from pawl shaft 47, which permits the shaft to turn under force of spring 48 to lock the fruit stop 28 as previously described, on page —, — paragraph.

It will be noted that the main coring blade 3 in the present case is not arranged to vibrate transversely of the arch as in the copending case filed under Serial Nos. 492,774 patented September 12, 1933, No. 1,926,965 and 614,426 patented January 2, 1934, No. 1,941,874 which show the blade especially designed for cutting the pits out of clingstone peaches which are hard and difficult to cut around, whereas the present machine is for pears which, being softer bodies without a large central pit, do not ordinarily require the vibration of the blade though it is evident that this feature may be incorporated if desired as the general construction of the machine is similar in many respects.

It should also be noted that stem grooving blade 17 is slanted so that its lower end will engage the fruit first with a hook-like action. This has been found to make a better cut than a straight loop blade.

I claim:—

1. A fruit-coring machine comprising fruit-positioning means having a fruit-receiving surface adapted to contact the flat face of a halved pear, a curved blade mounted above the fruit-receiving surface of said fruit-positioning means in a manner to swing downward in an arcuate path for cutting out the core of the half pear when in place against said surface, a second curved blade mounted and arranged below said fruit-receiving surface in a manner to swing and notch out the base of the pear and cut out the bloom residue, a stop against which the pear contacts for locating the bloom residue of the pear relative to said second curved blade, a third and smallest curved blade mounted beneath said fruit-receiving surface in a manner to slide longitudinally of and on the medial line of the half pear in a manner to groove out the stem continuation into the fruit, and means for actuating the three blades substantially at the same time.

2. A fruit-coring machine comprising fruit-positioning means having a fruit-receiving surface adapted to contact the flat face of a halved pear, a curved blade mounted above the fruit-receiving surface of said fruit-positioning means in a manner to swing downward in an arcuate path for cutting out the core of the half pear when in place against said surface, a second curved blade mounted and arranged below said fruit-receiving surface in a manner to swing and notch out the base of the pear and cut out the bloom residue, a stop against which the pear contacts for locating the bloom residue of the pear relative to said second curved blade, the two blades being spaced longitudinally of the pear to leave a bridge of meat extending transversely of the fruit, and means for varying the width of said bridge to suit various size pears cored on the machine, and means for actuating both blades substantially at the same time.

3. A fruit-coring machine comprising fruit-positioning means having a fruit-receiving surface adapted to contact the flat face of a halved pear, a curved blade mounted above the fruit-receiving surface of said fruit-positioning means in a manner to swing downward in an arcuate path for cutting out the core of the half pear when in place against said surface, a second curved blade mounted and arranged below said fruit-receiving surface in a manner to swing and notch out the base of the pear and cut out the bloom residue, a stop against which the pear contacts for locating the bloom residue of the pear relative to said second curved blade, a support slidable longitudinally of the fruit when in position and on which support said second curved blade and stop are mounted to move therewith, and means for actuating the two blades substantially at the same time.

4. A fruit-coring machine comprising fruit-positioning means having a fruit-receiving surface adapted to contact the flat face of a halved pear, a curved blade mounted above the fruit-receiving surface of said fruit-positioning means in a manner to swing downward in an arcuate path for cutting out the core of the half pear when in place against said surface, a second curved blade mounted and arranged below said fruit-receiving surface in a manner to swing and notch out the base of the pear and cut out the bloom residue, a stop against which the pear contacts for locating the bloom residue of the pear relative to said second curved blade, a support slidable longitudinally of the fruit when in position and on which support said second curved blade and stop are mounted to move therewith, a spring normally urging said support with its stop and second curved blade forwardly, means for locking the slidable support in any position of sliding adjustment, and means for actuating the two blades substantially at the same time.

5. In a coring machine, means for notching out the bloom residue from the base of a halved pear, comprising an arched blade of a size to encompass the objectionable bloom residue, means pivotally mounting the blade for swinging movement, and a fixed member fitting substantially within the curved blade forming a support to overlie the bloom portion of the half pear and against which the fruit is held during the cutting.

6. In a coring machine, means for notching out the bloom residue from the base of a halved pear, comprising an arched blade of a size to encompass the objectionable bloom residue, means pivotally mounting the blade for swinging movement, a fixed member fitting substantially within the curved blade forming a support to overlie the bloom portion of the half pear and against which the fruit is held during the cutting, and a fixed plate against which the end of the fruit is steadied during the cutting, said plate having a curved notch adjacent which the curved blade swings in emerging from the fruit in cutting the same.

7. In a construction as specified in claim 1, said fruit-receiving surface having a slot along which said last mentioned blade moves, and said slot arranged to afford a clear view of the stem portion of the pear therethrough for aligning same with said slot and smallest blade.

8. A fruit coring machine comprising a supporting arm, fruit positioning means carried by said arm adapted for positioning the flat face of a fruit half thereagainst, a turnable shaft extending along said arm, a blade actuated by said shaft arranged to cut out the core of a fruit half positioned against said positioning means, a second turnable shaft extending along said arm, and a blade arranged to cut out the bloom residue of said half fruit upon the turning of the second shaft, means permitting of variously separating the cuts of both blades and means for actuating both shafts.

9. A fruit coring machine comprising a supporting arm, fruit positioning means carried by said arm adapted for positioning the flat face of a fruit half thereagainst, a turnable shaft extending along said arm, a blade actuated by said shaft arranged to cut out the core of a fruit half positioned against said positioning means, a second turnable shaft extending along said arm, a blade arranged to cut out the bloom residue of said half fruit upon the turning of the second shaft, means permitting of variously separating the cuts of both blades, a third blade formed and arranged to move in a straight path to groove out the stem portion of the core, and means for actuating both shafts and simultaneously move said third blade.

10. A fruit coring machine comprising a supporting arm, fruit positioning means carried by said arm adapted for positioning the flat face of a fruit half thereagainst, a turnable shaft extending along said arm, a blade actuated by said shaft arranged to cut out the core of a fruit half positioned against said positioning means, a second turnable shaft extending along said arm, a blade arranged to cut out the bloom residue of said half fruit upon the turning of the second shaft, means permitting of variously separating the cuts of both blades, a foot treadle and means for actuating both shafts by said foot treadle.

11. In a construction as specified in claim 1, the last mentioned curved blade being slanted with its outer end advanced in direction of cutting to hook into the fruit.

12. A fruit coring machine comprising fruit positioning means adapted to receive the flat face of a halved pear, two curved blades each pivotally arranged on a separate axis to swing through a portion of the pear to respectively cut out the core and the bloom residue at the base of the pear, the latter blade being of a size and mounted to swing in a manner to cut a notch out of the base of the pear to remove the bloom residue therewith, said blades spaced to preserve a bridge of meat between their cuts, and means for actuating both blades simultaneously.

13. A fruit coring machine comprising fruit positioning means adapted to receive the flat face of a halved pear, two curved blades each pivotally arranged on a separate axis to swing through a portion of the pear to respectively cut out the core and the bloom residue at the base of the pear, the latter blade being of a size and mounted to swing in a manner to cut a notch out of the base of the pear to remove the bloom residue therewith, said blades arranged to both swing longitudinally of the pear and with their cuts spaced to preserve a bridge of meat between the cuts.

JOSEPH P. BEM.